United States Patent [19]

Egami et al.

[11] 4,437,345
[45] Mar. 20, 1984

[54] GAS FLOW MEASURING DEVICE

[75] Inventors: Tsuneyuki Egami, Aichi; Hisasi Kawai, Toyohashi; Tokio Kohama, Nishio; Hideki Obayashi, Okazaki, all of Japan

[73] Assignee: Nippon Soken, Inc., Nishio, Japan

[21] Appl. No.: 363,450

[22] Filed: Mar. 30, 1982

[30] Foreign Application Priority Data

Apr. 1, 1981 [JP] Japan ................................ 56-49803

[51] Int. Cl.³ .............................................. G01F 1/68
[52] U.S. Cl. ...................................... 73/204; 323/280
[58] Field of Search .......................... 73/204, 118 A; 324/DIG. 1; 323/273, 280, 281, 909

[56] References Cited

U.S. PATENT DOCUMENTS

| 4,057,206 | 11/1977 | Duncan et al. ................. 73/204 X |
| 4,089,214 | 5/1978 | Egami et al. .................... 73/204 X |
| 4,275,590 | 6/1981 | Kawai et al. . | |
| 4,276,773 | 7/1981 | Kawai et al. . | |
| 4,304,129 | 12/1981 | Kawai et al. . | |
| 4,373,387 | 2/1983 | Nishimura et al. ........... 73/118 A X |

Primary Examiner—Gerald Goldberg
Assistant Examiner—Brian R. Tumm
Attorney, Agent, or Firm—Cushman, Darby & Cushman

[57] ABSTRACT

A gas flow measuring device has a measuring circuit for measuring the flow of gas based on the output signals of an electric heater and a first and a second temperature dependent resistor. In the measuring circuit, the first and the second temperature dependent resistors, together with first and second reference resistors, form a bridge and a constant voltage is applied to a voltage at one diametrical point of the bridge. The difference between the other voltage of the diametrical point of the bridge and the output of the constant voltage adding circuit is amplified, and the output voltage of the amplifier circuit is further amplified so that the voltage applied to the electric heater and the bridge is feed-back controlled.

6 Claims, 7 Drawing Figures

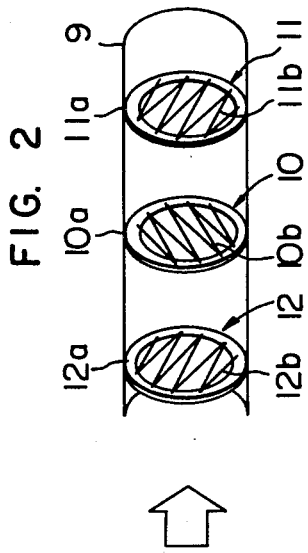
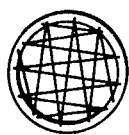
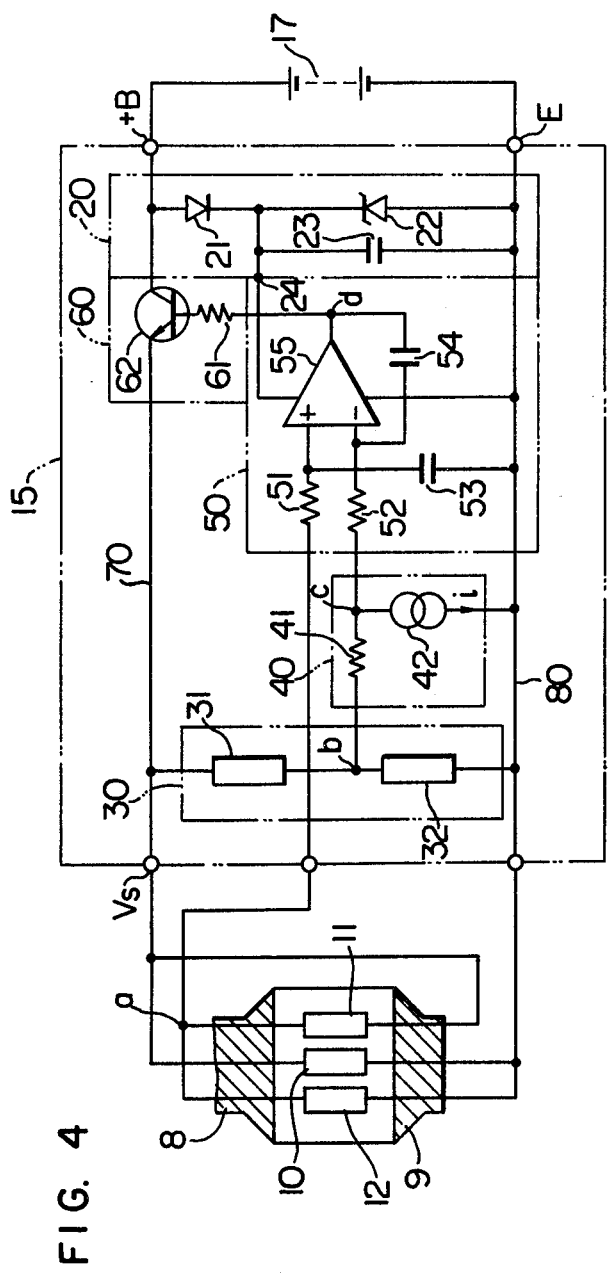

GAS FLOW MEASURING DEVICE

BACKGROUND OF THE INVENTION

This invention relates to a gas flow measuring device which is useful for measuring the flow of intake air of the engine.

It has heretofore been proposed that a flow measuring pipe is provided in the suction pipe of the engine, an electric heater is provided within this flow rate measuring pipe and temperature dependent resistors are positioned at the front and at the rear of the electric heater to form an intake air flow measuring device. According to this device, accurate measuring of flow is possible in a compact and simple structure. Further, measuring accuracy does not change with the installation status of the device.

However, the device of this type has required such elements as a chopper amplifier, a resistor of high accuracy and a capacitor in order to realize high accuracy despite the changes in temperature characteristics and changes in time of use of the differential amplifier. Such a conventional device amplifies the diametrical voltage of the bridge consisting of two temperature dependent resistors and two reference resistors by a differential amplifier and controls the voltage to be applied to the electric heater so that the voltage output thereof becomes constant.

SUMMARY OF THE INVENTION

This invention has been made to eliminate the above drawback and has an object of providing a gas flow measuring device which has a small number of circuit elements, can be produced at low cost and can measure flow with high accuracy.

This invention comprises a constant voltage adding circuit for adding a constant voltage to one of the voltages at a diametrical point of the bridge without amplifying the voltage at the diametrical point of the bridge, an amplifier circuit for amplifying the difference between the other voltage at the diametrical point of the bridge and the output voltage of the constant voltage adding circuit, and a power amplifier circuit for controlling the voltage to be applied to the constant heater and the bridge by amplifying the output voltage of the amplifier circuit. This invention copes with the above-described problems in this structure. According to this invention, since no amplifier is used for amplifying the potential difference between the diametrical points of the bridge, it is not necessary to consider the influence of the temperature drift of the operational amplifier. Further, since the number of parts required is small, the reliability of the device increases and the production cost is reduced substantially. Furthermore, by changing the additional voltage of the constant voltage adding circuit, the control value of the voltage between the diametrical points of the bridge can be selected, and difference of materials and variations between the first and the second temperature dependent resistors can be absorbed by a simple alteration so that the flow rate can be measured with high accuracy.

BRIEF DESCRIPTION OF THE DRAWINGS

FIG. 2 and FIG. 3 are a respective view and a front view showing the electric heater shown in FIG. 1 and the temperature dependent resistor shown in FIG. 1 and FIG. 2, FIG. 4 is an electrical circuit diagram showing a first embodiment of the measuring circuit shown in FIG. 1, and FIG. 5 through FIG. 7 are electrical circuit diagrams showing second to fourth embodiments of the measuring circuit.

DESCRIPTION OF THE PREFERRED EMBODIMENTS

Figure 1:
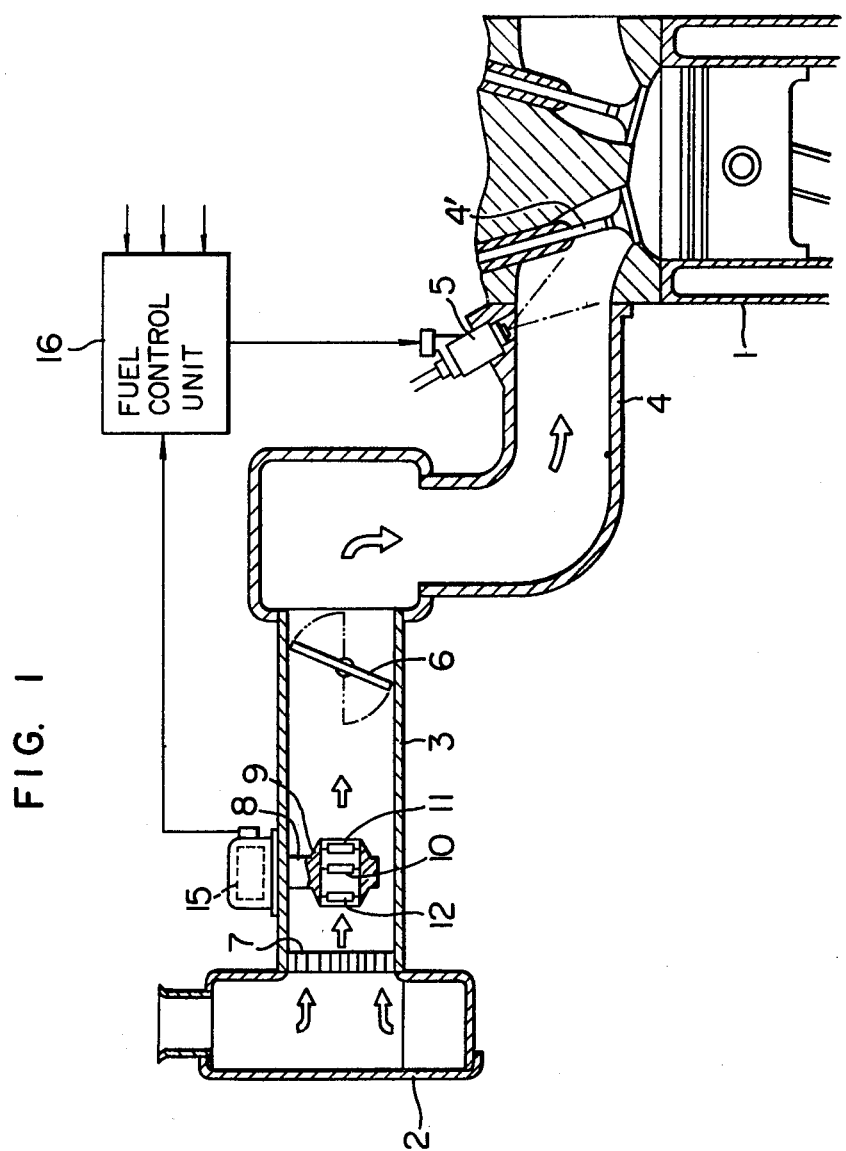
FIG. 1 is an overall structure diagram for showing this invention.

This invention will be described below by taking examples of an intake air flow measuring device for an internal combustion engine with reference to the embodiments shown in the drawings.

Referring to FIG. 1, an engine 1 is a spark ignition engine for driving a car. It inhales air for combustion through an air cleaner 2 and suction pipes 3 and 4 when a suction value 4' is opened. Fuel is supplied by injection by the quantity which meets the quantity of air inhaled, from a well-known electromagnetic fuel injection valve 5 installed in the suction pipe 4. A throttle valve 6 which is freely operated by the car driver to control the quantity of inhalled air is provided in the suction pipe 3. To improve the measuring accuracy of the measuring device to be described later, a honeycomb shaped rectifier grid 7 for rectifying the inhaled air flow is provided in the connection with the air cleaner 2 of the suction pipe 3.

Between the baffle grid and the throttle value 6 in the suction pipe 3, a compact flow measuring pipe 9 is installed supported by a pillar 8 almost in parallel with the axial direction of the pipe 3 to measure the flow rate of the inhaled air. An electric heater 10 consisting of platinum rhodium resistor wires, which is schematically shown in the drawing, is provided within the flow measuring pipe 9. A first temperature dependent resistor 11 consisting of a platinum rhodium resistor wire of which resistance changes in accordance with the temperature is provided at a position near the electric heater 10 at its down-stream side. A second temperature dependent resistor 12 consisting of a similar platinum rhodium resistor wire is provided at a position slightly apart from the electric heater 10 at its up-stream side.

All of the electric heater 10 and the first and the second temperature dependent resistors 11 and 12 have structures in which ring-shaped printed panels 10a, 11a and 12a have platinum rhodium or platinum resistor wires 10b, 11b and 12b in grid shapes respectively, as shown in FIG. 2. Of the above, platinum resistor wires having the same resistance temperature characteristics are used for the first and the second temperature dependent resistors 11 and 12. The electric heater 10 and the first temperature dependent resistor 11 are arranged such that the resistor wires cross with each other viewed from the front side (or the rear side) as shown in FIG. 3 so that the first temperature dependent resistor 11 is not subjected to the influence of minute heat distribution within the flow rate measuring pipe 9.

The above electric heater 10 and the first and the second temperature dependent resistors 11 and 12 are connected to a measuring circuit 15. The measuring circuit 15 measures the flow of the intake air by using the outputs from these, produces output electric signals corresponding to the flow and applies these signals to a fuel control unit 16.

The fuel control unit 16 mainly controls the value opening time of the electromagnetic fuel injection valve 5 in accordance with the signal of the measuring circuit 15. The fuel control unit 16 further applies signals of various types of sensors for detecting the rotation speed of the engine 1, the temperature of the cooling water and the density of oxygen in the exhaust gas, etc. whenever necessary. A well-known device may be used for the fuel control unit 16, and detailed explanation of this unit will be omitted.

The measuring circuit 15 will now be explained in detail with reference to FIG. 4. The measuring circuit 15 is connected to a DC power source 17 such as a battery so that the measuring circuit 15 is supplied with power by this power source 17. In order to absorb noises superimposed on the power source line of the power source 17, a noise absorbing circuit 20 is provided in the measuring circuit 15. The noise absorbing circuit 20 consists of a diode 21, a Zener diode 22 and a capacitor 23. When the ignition unit of the engine 1 and the stator motor become operative, noise voltage are superimposed on the power source line, but the noises equal to or greater than 20 V are absorbed by the Zener diode 22 and the noise less than 20 V are absorbed by the diode 21 and the capacitor 23. Accordingly, DC voltages almost free from noises are produced from a terminal 24.

When the polarity of the power source is reversed, the diode 21 interrupts the current from flowing so as to protect the circuits to be described below.

In the measuring circuit 15, a reference resistor circuit 30 consists of reference resistors 31 and 32 which are connected in series, and these reference resistors 31 and 32, together with the first and the second temperature dependent resistors 11 and 12, constitute a bridge, a and b are diametrical points of the bridge.

A constant voltage adding circuit 40 consists of a resistor 41 and a constant current source 42 and produces an output by applying a constant voltage to the voltage of point b out of the diametrical points a and b of the bridge. In this embodiment, the case where a minus voltage is applied is shown.

An amplifier circuit 50 consists of input resistors 51 and 52, capacitors 53 and 54 and an operational amplifier 55, and it produces an output by amplifying the difference between the voltage at the diametrical point a of the bridge and the output voltage of the constant voltage adding circuit 40. Capacitors 53 and 54 are provided for preventing the oscillation of this device.

A power amplifier circuit 60 includes an input resistor 61 and a power transistor 62, and the circuit 60 power amplifies the output voltage of the amplifier circuit 50 and applies it through a signal line 70 to a bridge includes the electric heater 10, the first and the second temperature dependent resistors 11 and 12 and the reference resistance circuit 30. 80 denotes an earth line.

In the above structure, a certain quantity of air determined by the aperture of the throttle valve 6 is injected into the engine 1 from the air cleaner 2 through the suction pipe 3. A certain proportion of air quantity of the total quantity of air inhaled passes through the flow rate measuring pipe 9.

Accordingly, the second temperature dependent resistor 12 provided at the upper-stream of the electric heater 10 is subjected only to the influence of the temperature of the intake air within the flow rate measuring pipe 9. On the other hand, the first temperature dependent resistor 11 provided at the down-stream of the electric heater 10 is subjected to the influences of the temperature of the intake air and the temperature of the air heated by the electric heater 10. As a result, a difference in temperature $\Delta T$ relating to the power quantity P (W) supplied to the electric heater 10 and the flow G (g/sec) of the intake air occur between the temperature dependent resistors 11 and 12.

The relationship given in the following expression exists among P, G and $\Delta T$.

$$K_1 \cdot \Delta T = P/G \tag{1}$$

(where $K_1$ is a constant)

Since the electric resistances of the temperature dependent resistors 11 and 12 change in accordance with the temperature of air, a potential difference $\Delta V$ which is determined by the temperature difference $\Delta T$ and the voltage V applied to the bridge occurs between the diametrical points a and b of the bridge as given by an expression (2).

$$\Delta V = K_2 \cdot \Delta T \cdot V \tag{2}$$

(where $K_2$ is a constant)

From the expressions (1) and (2), the following relationship is obtained.

$$K_3 \cdot \Delta V/V = P/G \tag{3}$$

(where $K_3$ is a constant)

When the power P supplied to the electric heater 10 and the voltage V applied to the bridge are controlled to keep the potential difference $\Delta V$ constant, the relationship among the flow G of the intake air, power supply P and the voltage V applied to the bridge is given by the following expression.

$$G = K_4 \cdot P \cdot V \tag{4}$$

(where $K_4$ is a constant)

The relationship between the power supply P to the electric heater 10 and the voltage V applied to the bridge is given by the following approximation expression (5) which gives no error.

$$P \doteq K_5 \cdot V^2 \tag{5}$$

(where $K_5$ is a constant)

The following expression is formed from this expression and the expression (4).

$$G \doteq K \cdot V^3 \tag{6}$$

(where K is a constant)

In other words, the flow G of the intake air is obtained as a function of the third power to the voltage V. Although this expression (6) is an approximation, it is the approximation which gives rise to little influence in the measuring and hence has little problem in its practical application.

The measuring circuit 15 controls the heat generation quantity of the electric heater 10, controls the potential difference $\Delta V$ between the points a and b of the bridge at a constant value and obtains the flow rate G of the inhaled air.

Assume that this control system is stabilized for a certain flow rate of air and a voltage V is generated at the signal line 70. Then, the voltage V is applied to the electric heater 10 and the bridge. In this case, voltage Va and Vb occur at the branch points a and b of the bridge respectively. The voltage Vb is applied to the constant voltage adding circuit 40, and a constant current i of a constant current source 42 flows through the resistor 41 from the point b of the bridge toward the earth line 80 in the constant voltage adding circuit 40. Thus, the voltage Vc at point c which is an output terminal thereof is given by the following expression.

$$Vc = Vb - i \cdot R \qquad (7)$$

(where R is a resistance of the resistor 41)

In the expression (7), the constant current i and the resistance R are constants. Therefore, the expression (7) can be replaced by the following expression.

$$Vc = Vb - Vo \qquad (8)$$

(where Vo is a constant)

This voltage Vc and the voltage Va at the point a of the bridge are applied to the amplifier circuit 50. The amplifier circuit 50 amplifies the difference between the voltage Va and the voltage Vc of the amplifier circuit 50 by the amplification factor A so that a voltage Vd is produced at point d.

An operational amplifier 55 of the amplifier circuit 50 uses only a capacitor 54 for feedback, so that the amplification factor A linearly becomes unlimitedly large and the following expressions (9) and (10) are obtained.

$$Vd = A \times (Va - Vc) \qquad (9)$$

$$Va = Vc \qquad (10)$$

As a result, the following expression is obtained from the expressions (8) and (10).

$$Vb - Va = Vo \qquad (11)$$

In other words, the output signal of the amplifier circuit 50 is power amplified by a power amplifier circuit 60 so that the potential difference between the diametrical points a and b of the bridge becomes equal to the voltage Vo which is determined by the constant voltage adding circuit 40, and the amplified voltage is applied to the electric heater 10 and the bridge and is then controlled by heat balance.

When the flow rate of air increases from this state, the rise in the temperature of air heated by the electric heater 10 is reduced, resulting in the reduction in the difference in temperatures $\Delta T$ between the first and the second temperature dependent resistors 11 and 12 and the increase in the voltage Va at the point a of the bridge. Therefore, the voltage Va becomes larger than the output voltage Vc of the constant voltage adding circuit 40 and the potential difference $\Delta V$ between the points a and b of the bridge becomes small. As a result, the output of the amplifier circuit 50 becomes large. Then, a power transistor 62 of the power amplifier circuit 60 increases the power supply to the electric heater 10 so that the heat generation quantity of the electric heater 10 is increased.

Accordingly, the difference in temperatures $\Delta T$ between the first and the second temperature dependent resistors 11 and 12 is increased and the potential difference $\Delta V$ between the points a and b of the bridge becomes large. The system is stabilized when the voltage Va at the point a of the bridge is equal to the output voltage Vc of the constant voltage adding circuit 40, or when the potential difference between the points a and b of the bridge is equal to the voltage applied by the constant voltage adding circuit 40.

When the flow rate of air inhaled decreases, the rise in the temperature of air heated by the electric heater 10 increases and the difference in temperature $\Delta T$ between the first and the second temperature dependent resistors 11 and 12 increases so that the voltage Va at the point a of the bridge becomes small. Therefore, the voltage Va becomes smaller than the output voltage Vc of the constant voltage adding circuit 40 and the output of the amplifier circuit 50 becomes small. Thus, the transistor 62 of the power amplifier circuit 60 reduces the power supply to the electric heater 10 and reduces heat generation quantity of the electric heater 10.

Accordingly, the system is stabilized in the stage when the difference in temperature $\Delta T$ is reduced and the potential difference $\Delta V$ between the points a and b of the bridge becomes small so that the voltage Va at the point a of the bridge becomes equal to the output voltage Vc of the control voltage adding circuit 40, or in the state when the potential difference $\Delta V$ between the points a and b of the bridge becomes a certain constant value.

In the manner described above, the potential difference $\Delta V$ between the points a and b of the bridge is always kept at an accurate constant value irrespective of the flow rate of the air inhaled, so that the expression (6) is formed and the flow rate G of the air inhaled is expressed by the function of the third power of the voltage V applied to the electric heater 10 and is produced from the terminal Vs as a voltage Vs relevant to the flow rate of the air inhaled.

The voltage Vs is input to the fuel control unit 16 as a signal which shows the flow rate G of the air inhaled, and the fuel control unit 16 produces an output of an injection pulse signal for opening the fuel injection valve 5 based on this signal and the output signal of the rotation speed sensor, etc.

In the measuring circuit 15 shown in FIG. 4, the constant voltage adding circuit 40 applies a minus voltage, and for the connection of the bridge, the first temperature dependent resistor 11 is connected to the signal line 70 side and the second temperature dependent resistor 12 is connected to the earth 80 side. A minus constant voltage is applied to the voltage at the diametrical point b of the bridge by the constant voltage adding circuit 40. This is connected to the reversed input side of the amplifier circuit 50 and the diametrical point a of the bridge is connected to the non-reversed input side of the amplifier circuit 50. According to this invention, the measuring circuits shown in FIG. 5 through FIG. 7 can also be used in addition to the one as described above.

Figure 5:
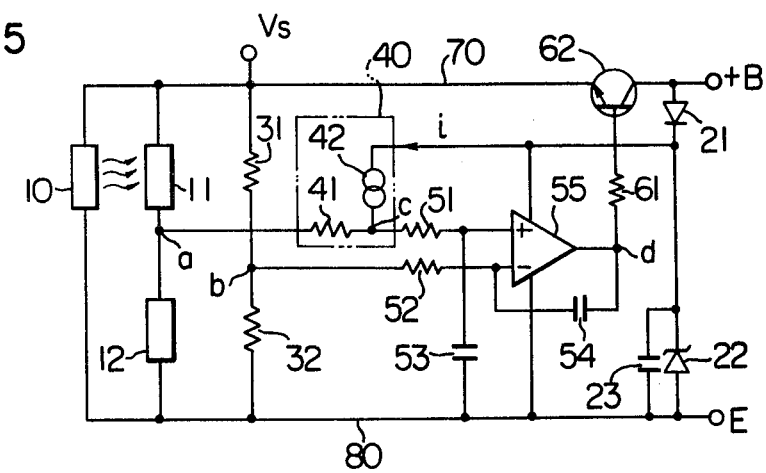

In the device shown in FIG. 5, the constant voltage adding circuit 40 consists of the resistor 41 and the constant current source 42, in which a constant current is flowing from the power source line of the operational amplifier 55 toward the diametrical point a of the bridge so that a plus constant voltage is applied. It is apparent that the same operation as shown in FIG. 4 can be obtained with this structure.

Figure 6:
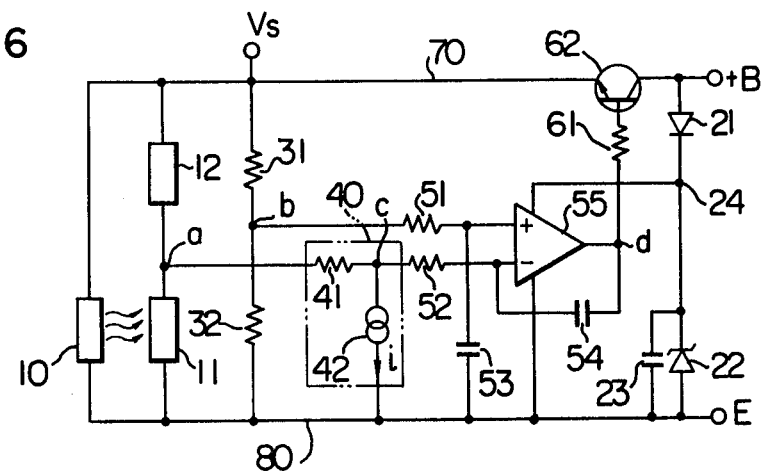

In the device shown in FIG. 6, the first temperature dependent resistor 11 is connected to the earth line 80 side and the second temperature dependent resistor 12 is connected to the signal line 70 side to form a bridge. The constant voltage adding circuit 40 consists of the resistor 41 and the constant current source 42 and a constant current is flowing from the diametrical point a of the bridge toward the earth line 80 so that a minus constant voltage is applied and the output of the constant voltage adding circuit 40 is connected to the reversed input side of the operation amplifier 55, with the branch point b of the bridge connected to the non-reversed input of the operation amplifier 55. With this device, the potential difference $\Delta V$ between the points a and b of the bridge can be controlled at a constant value.

Figure 7:
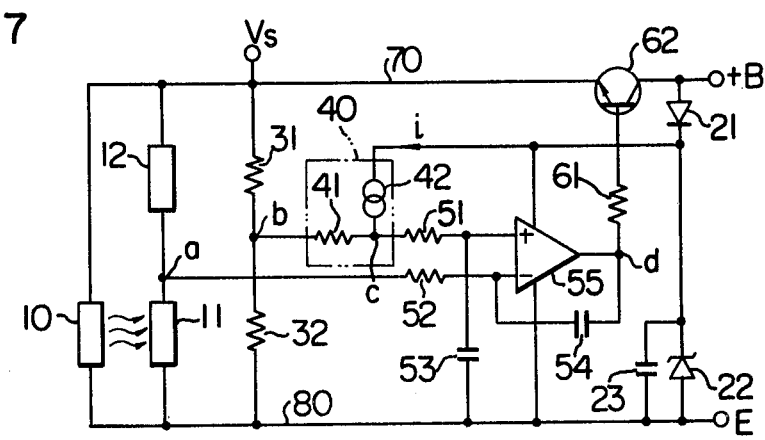

In the device shown in FIG. 7, the structure of the bridge is the same as that shown in FIG. 6, and a constant current is flowing from the power source of the operation amplifier 55 toward the diametrical point b of the bridge in the constant voltage adding circuit 40 to apply a plus constant voltage. It is apparent that the same operation can be obtained with this structure.

While in the above embodiments, examples have been shown in the application of this invention to the measuring of flow rate of air inhaled into the fuel injection type engine, it is needless to mention that this invention can also be applied, for example, to the control of recirculation quantity of exhaust gas and the ignition timing advance quantity based on the flow rate of the air inhaled into the carburetor type engine. It can also be applied to the measuring of the flow rate of gas in other industrial measuring fields, not limited to the engine.

What is claimed is:

1. A gas flow measuring device comprising an electric heater installed in a pipe through which a gas to be measured flows, a first temperature dependent resistor installed at the down-stream side of the electric heater within said pipe, a second temperature dependent resistor installed at a position substantially free from heat produced from said electric heater within said pipe, and a measuring circuit for measuring the flow of a gas to be measured by using output signals of said electric heater and first and second temperature dependent resistors, wherein said measuring circuit includes a reference resistor circuit for forming a bridge having diametrical nodes together with said first and second temperature dependent resistors, a constant voltage adding circuit having a resistor and a constant current source connected in parallel with the reference resistor circuit to provide a constant current thereto for applying a constant voltage to one of said diametrical nodes of the bridge, a differential amplifier circuit having two inputs for amplifying the differential voltage between the other of the diametrical nodes of said bridge and the output of said constant voltage adding circuit at said one of said nodes, the resistor of said constant voltage adding circuit being connected between one of said nodes and one of said inputs, and an electrical amplifier circuit for amplifying the output voltage of said differential amplifier circuit and for controlling the voltage to be applied to said electric heater and said bridge.

2. A device according to claim 1, wherein the resistor of said constant voltage adding circuit is connected between said reference resistor circuit and the negative input terminal of said differential amplifier.

3. A device according to claim 1, wherein the resistor of said constant voltage adding circuit is connected between the connection point of said first temperature dependent resistor and said second temperature dependent resistor, and the positive input terminal of said differential amplifier.

4. A device according to claim 1, wherein the resistor of said constant voltage adding circuit is connected between the connection point of said first temperature dependent resistor and said second temperature dependent resistor, and the negative input terminal of said differential amplifier.

5. A device according to claim 1, wherein the resistor of said constant voltage adding circuit is connected between said reference resistor circuit and the positive input terminal of said differential amplifier.

6. A device according to any of claims 1 to 5, wherein said differential amplifier having a non-inverting input terminal and an inverting input terminal and further an output terminal, a first resistor connected in series with said non-inverting terminal, a second resistor connected in a series with said inverting terminal, a first capacitor connected in parallel with said non-inverting terminal, and a second capacitor connected between said inverting terminal and said output terminal.

* * * * *